United States Patent
Wang et al.

(10) Patent No.: US 11,477,051 B2
(45) Date of Patent: Oct. 18, 2022

(54) METHOD AND DEVICES FOR DATA TRANSMISSION IN SUBSTATION

(71) Applicant: ABB Schweiz AG, Baden (CH)

(72) Inventors: Zhui Wang, Xiamen (CN); Huixiang Chen, Zhangzhou (CN); Hongzheng Chen, Xiamen (CN)

(73) Assignee: ABB SCHWEIZ AG, Baden (CH)

( * ) Notice: Subject to any disclaimer, the term of this patent is extended or adjusted under 35 U.S.C. 154(b) by 6 days.

(21) Appl. No.: 16/886,032

(22) Filed: May 28, 2020

(65) Prior Publication Data

US 2020/0295971 A1    Sep. 17, 2020

Related U.S. Application Data

(63) Continuation of application No. PCT/CN2017/113637, filed on Nov. 29, 2017.

(51) Int. Cl.
| | | |
|---|---|---|
| H04L 12/66 | (2006.01) | |
| H04L 12/28 | (2006.01) | |
| H04W 88/16 | (2009.01) | |
| H04L 43/04 | (2022.01) | |
| H04L 43/0811 | (2022.01) | |
| H04Q 9/00 | (2006.01) | |
| H04W 4/38 | (2018.01) | |
| H04L 12/40 | (2006.01) | |

(52) U.S. Cl.
CPC .......... *H04L 12/66* (2013.01); *H04L 12/2809* (2013.01); *H04L 12/2818* (2013.01); *H04L 12/2823* (2013.01); *H04W 88/16* (2013.01)

(58) Field of Classification Search
None
See application file for complete search history.

(56) References Cited

U.S. PATENT DOCUMENTS

| | | |
|---|---|---|
| 2004/0002385 A1 | 1/2004 | Nguyen |
| 2011/0140910 A1 | 6/2011 | Olson et al. |
| (Continued) | | |

FOREIGN PATENT DOCUMENTS

| | | |
|---|---|---|
| CN | 103684933 A | 3/2014 |
| CN | 104272781 A | 1/2015 |
| CN | 106385332 A | 2/2017 |

OTHER PUBLICATIONS

State Intellectual Property Office of the P.R. China, International Search Report & Written Opinion issued in corresponding Application No. PCT/CN2017/113637, dated Aug. 22, 2018, 9 pp.

(Continued)

*Primary Examiner* — Jay L Vogel
(74) *Attorney, Agent, or Firm* — Greenberg Traurig, LLP (57) ABSTRACT

Embodiments of the present disclosure relate to a data transmission method and associated devices. In the method, data collected by at least one monitoring device in a substation is received at a gateway. Further, a status of a connection between the gateway and a first network is detected, where the first network enables communication between the gateway and a server. Further, in response to detecting a disconnection between the gateway and the first network, the data is sent to a user device via a second network hosted by the gateway to enable the user device to forward the data to the server.

14 Claims, 4 Drawing Sheets

(56) References Cited

U.S. PATENT DOCUMENTS

| | | | |
|---|---|---|---|
| 2011/0216646 A1* | 9/2011 | Flinta | H04L 12/66 370/220 |
| 2012/0094600 A1 | 4/2012 | DelloStritto et al. | |
| 2012/0233468 A1* | 9/2012 | Song | H04L 63/08 713/171 |
| 2014/0236515 A1 | 8/2014 | Ho et al. | |
| 2014/0250064 A1 | 9/2014 | Hopmann et al. | |
| 2015/0019488 A1 | 1/2015 | Higginson et al. | |
| 2015/0237154 A1* | 8/2015 | Wang | H04L 67/28 709/217 |
| 2015/0332424 A1* | 11/2015 | Kane | H04L 41/22 705/325 |
| 2016/0182471 A1 | 6/2016 | Wilson et al. | |
| 2017/0078943 A1* | 3/2017 | Jurzak | H04W 36/32 |
| 2017/0223765 A1* | 8/2017 | Justen | H04W 76/10 |
| 2017/0272121 A1* | 9/2017 | Dao | H04W 4/70 |
| 2017/0289121 A1* | 10/2017 | Harwell | H04W 12/068 |
| 2017/0302669 A1 | 10/2017 | Chen et al. | |
| 2019/0149618 A1* | 5/2019 | Tsai | H04L 12/66 709/202 |
| 2019/0340389 A1* | 11/2019 | Hattori | G06F 21/6254 |

OTHER PUBLICATIONS

Extended European Search Report, issued by the European Patent Office, regarding corresponding patent application Serial No. 17933465.1; dated Jun. 11, 2021; 10 pages.

Dukan, Peter and Kovari, Attila, et al.; "Cloud-based Smart Metering System"; CINTI 2013—14th IEEE International Symposium on Computational Intelligence and Informatics; Nov. 19-21, 2012; Budapest, Hungary; pp. 499-502.

Zhu, et al. "IOT Gateway: Bridging Wireless Sensor Networks Into Internet of Things"; 2010 IEEE/ IFIP International Conference on Embedded and Ubiquitous Computing; IEEE Computer Society; School of Software and Microelectronics, Peking University, Beijing, China; Dec. 11-13, 2010; pp. 347-352.

China First Office Action, issued by the National Intellectual Property Administration, regarding corresponding patent application Serial No. CN 201780096707.9; dated Mar. 7, 2022; 27 pages (with English Translation).

* cited by examiner

METHOD AND DEVICES FOR DATA TRANSMISSION IN SUBSTATION

FIELD

Embodiments of present disclosure generally relate to data transmission, and more specifically, to a method and devices for data transmission in a substation.

BACKGROUND

In Cloud-based smart electrical systems, measurement data come from the local data collection/monitoring devices in various substations. However, many stations are located in remote or rural areas in which no Internet access (for example, via 3G/4G or LAN) is available. Therefore, how to push the so-called "offline data" from those substations to the Cloud server for presentation or further analyses become challenging.

There have been proposed some data transmission solutions, to migrate data from one or more source databases to one or more target databases. However, none of those methods aims at a scenario in which no Internet access is available. Till now, no effective solution is found to push such "offline data" to the Cloud server.

SUMMARY

Embodiments of the present disclosure provide a data transmission solution for use in a substation.

In first aspect, a data transmission method is provided. The method comprising: receiving, at a gateway, measurement data collected by at least one monitoring device in a substation; storing the received measurement data in a data storage that is accessible to the gateway in a predetermined format; detecting a status of a connection between the gateway and a first network, the first network enabling communication between the gateway and a server; and in response to detecting a disconnection between the gateway and the first network, sending the measurement data to a user device via a second network hosted by the gateway to enable the user device to forward the measurement data to the server.

In some embodiments, the first network is a wide area access (WAN) network, and the second network is a WI-FI network hosted by the gateway.

In some embodiments, receiving the measurement data comprising: receiving the measurement data through a field bus connected between the gate way and the at least one monitoring device.

In some embodiments, sending the measurement data to the user device includes: retrieving the measurement data from the data storage; encrypting the retrieved measurement data; and sending the encrypted measurement data to the user device.

In some embodiments, the method further comprises: receiving, at the user device, the measurement data from the gateway via the second network hosted by a gateway; detecting, a status of a connection between the user device and the first network, the first network enabling communication between the user device and the server; in response to detecting that the user device is connected to the first network, sending, via the first network, a first request for an access to the server; and in response to receiving, via the first network, a first authorization to the first request from the server, sending the measurement data to the server via the first network.

In some embodiments, sending the measurement data to the server comprises: in response to receiving the first authorization that is based on a category and geographical information associated with a user of the user device, sending the measurement data to the server.

In some embodiments, receiving the measurement data comprises: sending, via the second network, a request for the measurement data to the gateway; and in response to receiving, via the second network, a second authorization to the second request from the gateway, receiving the measurement data at the user device.

In some embodiments, receiving the measurement data at the user device comprises: in response to receiving the second authorization that is based on a category and a geographical information associated with a user of the user device, receiving the measurement data at the user device.

In some embodiments, the method further comprises: in response to receiving, via the first network, a confirmation of the measurement data being received at the server, deleting the measurement data from the user device.

In second aspect, a gateway is provided. The gateway comprises: a controller configured to: receive measurement data collected by at least one monitoring device in a substation; store the received measurement data in a data storage that is accessible with the gateway in a predetermined format; detect a status of a connection between the gateway and a first network, the first network enabling communication between the gateway and a server; and in response to detecting a disconnection between the gateway and the first network, send the measurement data to a user device via a second network hosted by the gateway to enable the user device to forward the measurement data to the server.

In some embodiments, the first network is a wide area access (WAN) network, and the second network is a WI-FI network hosted by the gateway.

In some embodiments, the gate way is connected to the at least one monitoring device through a field bus.

In some embodiments, the controller is further configured to: retrieve the measurement data from the data storage; encrypt the retrieved measurement data; and send the encrypted measurement data to the user device.

In third aspect, a user device is provided. The user device comprises: a controller configured to receive measurement data collected by at least one monitoring device in a substation, via a second network hosted by a gateway; detect, a status of a connection between the user device and a first network, the first network enabling communication between the user device and a server; and in response to detecting a connection between the user device and the first network, send, via the first network, a first request for an access to the server; and in response to receiving, via the first network, a first authorization to the first request from the server, send the measurement data to the server via the first network.

In some embodiments, the controller is further configured to: in response to receiving the first authorization that is based on a category and a geographical information associated with a user of the user device, send the measurement data to the server.

In some embodiments, the controller is further configured to: send, via the second network, a request for the measurement data to the gateway; and in response to g receiving, via the second network, a second authorization to the second request from the gateway, receive the measurement data at the user device.

In some embodiments, the controller is further configured to: in response to receiving the second authorization that is based on a category and a geographical information associated with a user of the user device, receive the measurement data at the user device.

In some embodiments, the controller is further configured to: in response to receiving, via the first network, a confirmation of the measurement data being received at the server, delete the measurement data from the user device.

In fourth aspect, a data transmission system in a substation is provided. The data transmission system comprises: at least one monitoring device configured to collect measurement data in the substation; a gateway connected to the at least one monitoring device via a field bus; and a user device, wherein the user device and the gateway are configured to jointly perform the data transmission method according to first aspect of the present disclosure, to forward the measurement data from the at least one monitoring device to the server.

DESCRIPTION OF DRAWINGS

Drawings described herein are provided to further explain the present disclosure and constitute a part of the present disclosure. The example embodiments of the disclosure and the explanation thereof are used to explain the present disclosure, rather than to limit the present disclosure improperly.

Throughout the drawings, the same or similar reference symbols are used to indicate the same or similar elements.

DETAILED DESCRIPTION OF EMBODIMENTS

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

Figure 1:
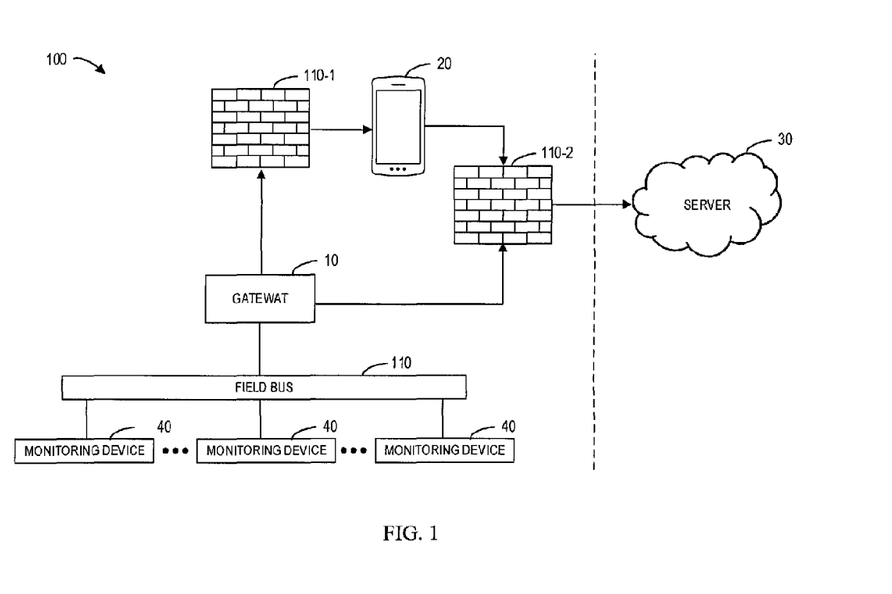
FIG. 1 illustrates a schematic diagram of a data transmission system in a substation, in accordance with embodiments of the present disclosure.

FIG. 1 illustrates a schematic diagram of the data transmission system in a substation 100. As shown, the data transmission system generally includes a plurality of monitoring devices 40 located in the substation 100 that collect various measurement data. The measurement data (may also be referred to as "sensor measurement data") include, but not limited to, voltage, current, temperature of upper and lower contact arms, temperature of cable head, busbar temperature, gas pressure, gas density, ambient temperature, ambient humidity, mechanical characteristics of circuit breaker, location of circuit breaker, location of handcart, position of earth switch.

The substation 100 also includes a gateway 10 that is connected to the multiple monitoring devices 40 via a field bus 110. For example, in some embodiments, the field bus 110 may be a bus that complies with an industrial protocol, such as Modbus, 103 or the like.

As discussed above, when such a substation 100 as shown in FIG. 1 is located in an area with no Internet access, the received data at the gateway 10 is "offline" and thus cannot be forwarded to the server 30 for further usage. The server 30 may be a cloud server or other remotely located server. In this case, according to various embodiments of the present disclosure, the collected offline data is first sent to a user device 20 via a second network hosted by the gateway 10, and then uploaded to the server 30 whenever the user device 20 is connected or re-connected with a first network which enables communication between the user device 20 and the server 30.

In some embodiments, the first network may be a wide area access (WAN) network, such as Internet, and the second network may be a local access network (LAN) hosted by the gateway 10, such as a WI-FI network hosted by the gateway 10 in this example. It is to be understood, however, that the scope of the present disclosure does not limited to the types of the first and/or second network.

In this way, those personals or professionals, such as station administrators or support engineers, can easily access those "offline data" collected from substations and upload those data to a server for further process and analysis, without the need to take out the specific industrial SD card in which the data are stored.

In some embodiments, the substation 100 may also include firewalls 110-1 and 110-2 configured to prevent unauthorized or unwanted communications between different networks. As shown, the firewall 110-1 is used to prevent unauthorized or unwanted access to the gateway 10 by the user device 20, and the firewall 110-2 is used to prevent unauthorized or unwanted data push from the user device 20 to the server 30.

Figure 2:
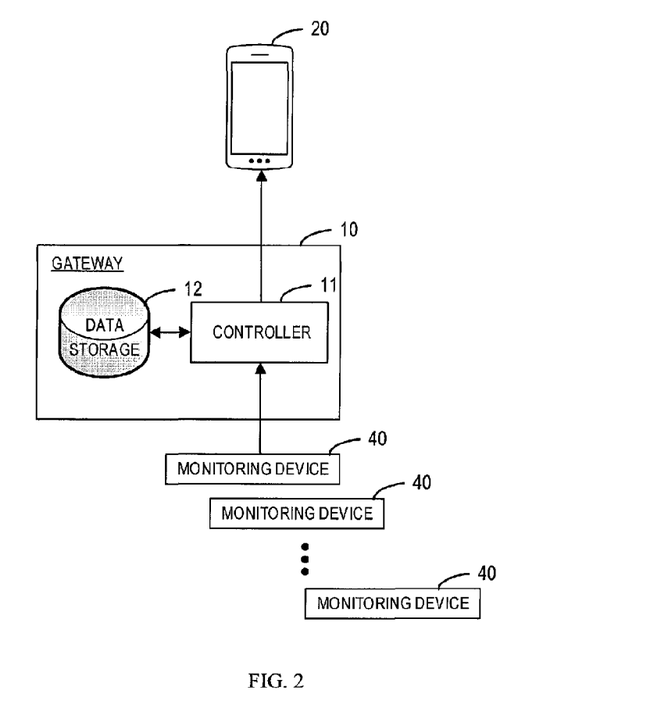
FIG. 2 illustrates a schematic diagram of the data transmission from monitoring devices to a user device via a gateway, in accordance with embodiments of the present disclosure.

FIG. 2 illustrates a schematic diagram of the data transmission from the monitoring devices 40 to the user device 20 via the gateway 10, in accordance with embodiments of the present disclosure. As illustrated in FIG. 2, the gateway 10 includes a controller 11. The controller 11 is configured to receive the measurement data collected by multiple monitoring devices 40 in the substation 100.

In order to continue to forward the received data to a server, the controller 11 is further configured to detect a status of a connection between the gateway 10 and the first network. If a disconnection between the gateway 10 and the first network is detected, as discussed above, the measurement data will be first sent to the user device 20 via the second network hosted by the gateway 10 to enable the user device 20 to forward the measurement data to the server 30 at a later time.

Although the user device 20 in this example is represented as a mobile terminal, it is to be understood that any WI-FI compatible user devices, such as laptop computer and tablets, that have their own storage space are possible to implement the data transmission method in accordance to various embodiments of the present disclosure.

In an example of mobile terminal, an application might be developed and installed therein and the personal or professionals may need to login the App to download the stored data from the gateway 10. Likewise, in an example of a laptop computer, a program (which may be in a form of a client application or web browser) may be developed and installed thereon, so that the personal or professionals can login to download the data.

As further illustrated in FIG. 2, the controller 11 is configured to store the received data in a data storage 12 that is accessible to the gateway 10. In this example, a single data storage 12 is integrated within the gateway 10. However, it is to be appreciated that multiple data storages located/distributed in a variety of locations (for example, outside the gateway) and communicatively coupled to the controller 11 is also possible, depending on implementation-specific needs.

In the context of the subject matter described herein, the data storage 12 may be a machine readable signal medium or a machine readable storage medium. The data storage 12 may include but not limited to an electronic, magnetic, optical, electromagnetic, infrared, or semiconductor system, apparatus, or device, or any suitable combination of the foregoing. More specific examples of the data storage 12 would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In some embodiments, before the data is stored in the data storage 12, the data may be optionally decoded, processed, and arranged by the software developed and installed in the gateway 10. This allows the collected data to be pre-processed at the gateway 10 before being forwarded to the user device 20 and to the server 30, which reduces the processing burden at the user device end and the server end. Alternatively, in other embodiments, such pre-process of the data may be performed at the user device 20, after the data is received at the user device 20.

In some embodiments, the controller 11 may be further configured to store the received data in the data storage 12 in a predetermined format. For example, the received data may be stored in the data storage 12 in a given data structure by using an embedded Structured Query Language (SQL) in the Gateway, in order to ease the item search and update.

In some embodiments, the data structure at the data storage 12 may be consistent with that at the server. The agreed data structure not only ease the item search and update at the gateway end and the server end, but also provide a criterion to facilitate the server in determining whether the data is an illegal data, as some illegal data may not have the agreed data structure.

Figure 3:
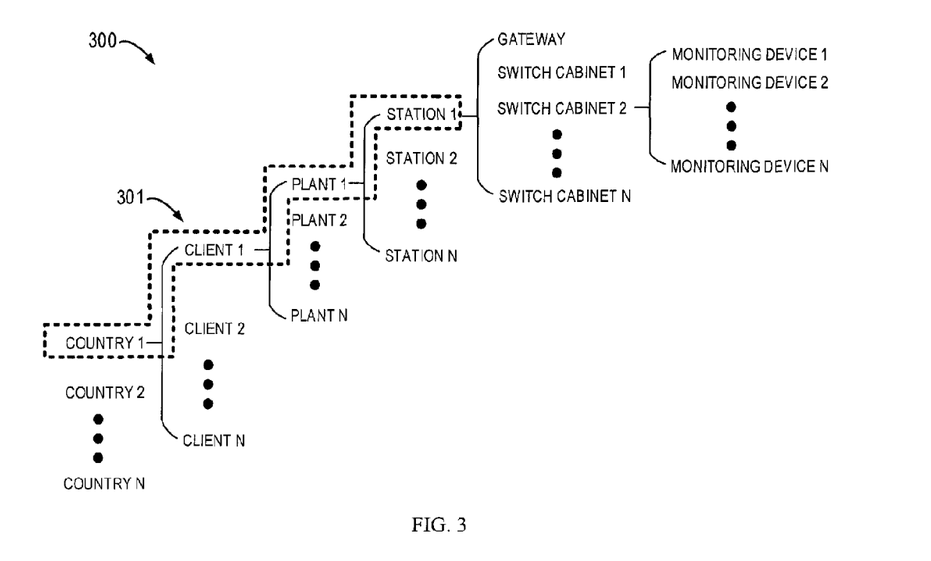
FIG. 3 illustrates an example data structure of the data stored at the gateway and/or the server, in accordance with an embodiment of the present disclosure.

FIG. 3 illustrates an example data structure 300 of the data stored at the gateway 10 and/or the server 30. As shown, in this example, the data structure 200 includes the following items: "country", "client", "plant", "station", "switch cabinet", and "monitoring device". It is to be noted that the data structure 300 as shown is only an example, and other data structures containing other items or based on other categories can also be envisaged depending on the actual requirements.

In some embodiments, the controller 11 may be further configured to retrieve the data from the data storage 12 and encrypt the retrieved data, before sending the data to the user device 20. In this way, the security of the transferred data may be guaranteed during the transfer process. In other words, any unauthorized attempts to access the data (such as download or even view or of the transferred data) by unauthorized personals through the user device 20 may be prevented.

By way of example, a key generated by the advanced encryption standard (AES) algorithm can be used to encrypt the local SQLite file of the gateway 10, and the user needs to login to open the file. Otherwise the user will be informed that the data have been encrypted. Of course, the above-mentioned data encryption may also be implemented at the user device 20 by means of for example digital certificate.

Figure 4:
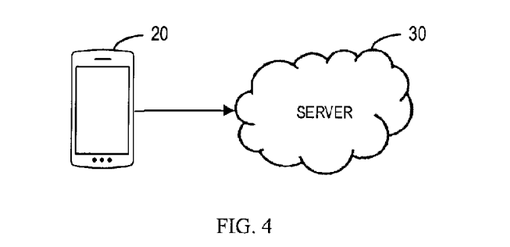
FIG. 4 illustrates a schematic diagram of the data transmission from a user device to a server, in accordance with embodiments of the present disclosure.

FIG. 4 illustrates a schematic diagram of the data transmission from the user device 20 to the server 30, in accordance with embodiments of the present disclosure. After the collected data is received at the user device 20 via the WI-FI network hosted by the gateway 10 as described in FIG. 1, a controller (not shown) of the user device 20 is configured to detect a status of a connection between the user device 20 and Internet, via which (through a WI-FI spot or 3G/4G) the user device 20 can communicate with the server 30. When the user device 20 is detected to be connected to Internet, the data may be forwarded to the server 30 via Internet.

In some embodiments, before obtaining the data at the user device 20, the controller of the user device 20 may send a first request for the data to the gateway 10 via the WI-FI hosted by the gateway 10. Upon receipt of a first authorization to the first request from the gateway 10 via the WI-FI network, the data may be received at the user device 20. In aid of such a request-authorization mechanism between the user device 20 and the gateway, the gateway 10 may verify whether the user device 20 or the log-in user is eligible to access the data in the substation. In some embodiments, the user authorization may be performed via Cookies, for example.

In some embodiments, the users may be categorized into different groups. Only by way of example, users may be categorized into: "administrator", "developer", "global product manager", "regional product manager", "field service engineer", "remote service engineer", and users from different groups may have different authorizations. For instance, a global product manager may have the authorization to access more data compared to a regional product manager.

In some embodiments, users may be further categorized based on various countries, regions, and sites. In this way, a personal from one site may not be allowed to access the data in another site. For instance, a field engineer associated with "station 1" might not have authorization to access the data in "station 2". For another instance, a field engineer associated with China might not have authorization to access the data in the US.

By way of example, when a user logins the data transmission system via an App of the user device 20, it will be firstly verified, for example, whether the user belongs to the category of "field service engineer". If it is verified that the user is a field service engineer, then the user can be assigned with corresponding service permission as shown in Table 1. This action may also be called the first verification procedure.

TABLE 1

| Function Rights | File Service Role |
|---|---|
| view service requests | Yes |
| view/create/edit/delete service requests | Yes |
| view gateways | Yes |

TABLE 1-continued

| Function Rights | File Service Role |
| --- | --- |
| view/create/edit gateways | No |
| view customers | No |
| view filed monitoring data | Yes |
| view/download/push filed monitoring data | No |

As shown in Table 1, in this example, the field service engineer is only given permission to view gateways, while he/she is not permitted to view/add/edit the gateways. As further illustrated in Table 1, this example field service engineer is only allowed to view the filed monitoring data, while the field service engineer is not permitted to view/download/push the filed monitoring data.

Next, the field service engineer's geographical permissions will be verified. This subsequent verification procedure may also be called the second verification procedure. In some embodiments, some service engineers can only see the part of countries, clients, plants and substations that they are permitted to view, according to their assigned authorities. As shown in Table 2, this example field service engineer is only allowed to access the data from Country 1, Client 1, Plant 1, and Substation 1.

In this way, this field service engineer can determine which substation/plant/client/country the received local monitoring data should belong to, according to his/her function rights given in Table 1 and his/her geographical rights given in Table 2. As such, when the user pushes the received data to the server 30, the received data can be automatically associated with the corresponding part for the substation in the server 30, via the link path 301 "Country 1→Client 1→Plant 1→Substation 1" as shown in Table 2. FIG. 2 likewise illustrates this link path 301 in another form.

TABLE 2

| Field Service Role | Country | Client | Plant | Substation |
| --- | --- | --- | --- | --- |
| Global Service | n | n | n | n |
| Country Service | 1 | n | n | n |
| Client Service |  | 1 | n | n |
| Plant Service |  |  | 1 | n |
| Substation Service |  |  |  | 1 |

If some measurement data of the substation 1 has been registered with the server 30 before, and substation 1 is under the user's authority according to the scope of his/her authority and the actual affiliation of the substation, then the user can directly select the existing substation 1 on the server 30 to associate the received data to the substation 1.

On the other hand, if the substation 1 is not registered with the server 30 before, but substation 1 is under the user's authority according to the scope of his/her authority and the actual affiliation of the substation, the user can associate the received data to substation 1 for the first time, so as to establish the relationship model of the data.

In some embodiments, before continuing to forward the data to the server 30, the controller of the user device 20 may be further configured to send a second request for an access to the server 30 via Internet. After receiving a second authorization to the second request from the server 30, the data may be sent to the server 30 via Internet. Such request-authorization mechanism between the user device 20 and the server 30 is helpful for determining at the server 30 whether the user device 20 is eligible to push the data to the server 30, or whether the log-in user is an authorized user to push the data to the server 30. In this way, the accuracy and completeness of data on the server can be ensured. Merely by way of example, this user authorization may be performed via an open authorization (OAUTH) protocol.

By way of example, server 30 may again verify the user's authorization to push the local data to cloud and the user's authorization to access to the parent node of the pushed data. If the user is an authorized user, the server 30 will be allowed to receive the pushed data from the user device 20, otherwise, the server 30 will returns an error of "unauthorized".

In some embodiments, during the data transmission, the server 30 may not store data until the data is completely transmitted. In an example, when the data communication is interrupted, for example by an incoming call, the file at the user device 20 at the interruption moment will be saved, and the progress of the current transmission will be labelled. For example, the identifications (IDs) of monitoring devices whose data have been completely transmitted at the interruption moment will be recorded, and so will be the IDs of monitoring devices whose data are still being transmitted.

In the next transmission, the user device 20 will perform the re-transmission based on those labels. For example, in the next transmission, the server 30 may first detect the new data to verify whether database of the server 30 has already contained the same information as the new data does, for example, whether the data is duplicated data, and whether the received ID of the monitoring device is consistent with any ID in the database.

In some embodiments, after fully accepting the uploaded data, the server 30 will first verify the completeness and accuracy of the received file, such as verifying whether the structure of the file conforms to a pre-defined structure, and whether the types of various fields in the received file are matched with the pre-defined types.

In some embodiments, after the server 30 receives the data and completely stores the received data, the server 30 will send a reply signal to the gateway 10 to indicate the data reception is completed. When the user device 20 receives the reply signal, the user will be prompted that the upload is successful. After the user device 20 receives this information of the successful upload, the controller of the user device 20 may delete the data from its storage, in order to avoid the leak of the data.

Figure 5:
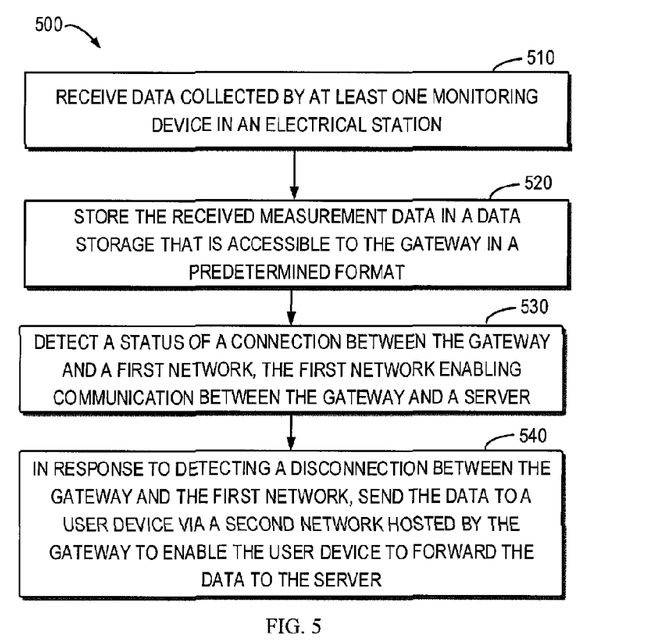
FIG. 5 illustrates a flowchart of a data transmission method implemented at the gateway, in accordance with an embodiment of the present disclosure.

FIG. 5 illustrates a flowchart of the data transmission method 500 implemented at a gateway. The method 500 described herein may be implemented by the controller associated with the gateway as described above. Such controller may be placed in the gateway and implemented as a circuit.

At block 510, data collected by at least one monitoring device in a substation is received.

At block 520, the received measurement data is stored in a data storage that is accessible to the gateway in a predetermined format.

At block 530, a status of a connection between the gateway 10 and a first network is detected, and the first network enables communication between the gateway 10 and a server 30.

At block 540, in response to detecting a disconnection between the gateway and the first network, the data is sent to a user device via a second network hosted by the gateway to enable the user device to forward the data to the server.

Figure 6:
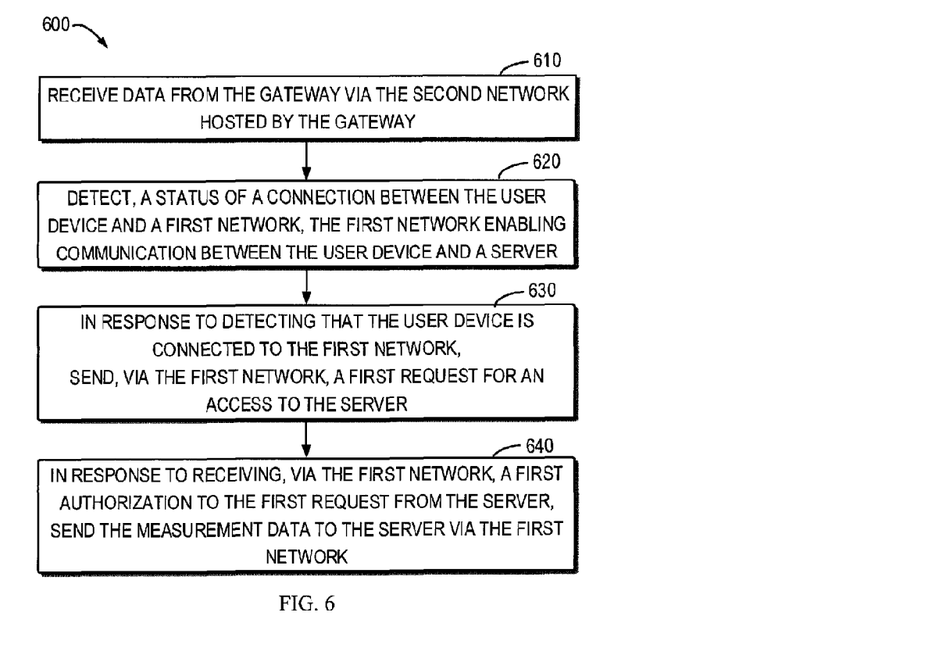
FIG. 6 illustrates a flowchart of a data transmission method implemented at the user device, in accordance with an embodiment of the present disclosure.

FIG. 6 illustrates a flowchart of the data transmission method 600 implemented at a user device. The method 600 described herein may be implemented by the controller of the user device as described above.

At block 610, data is received from a gateway 10 via a second network hosted by a gateway 10, and the data is collected by at least one monitoring device 40 in a substation.

At block 620, a status of a connection between the user device 20 and a first network is detected, and the first network enables communication between the user device 20 and a server 30.

At block 630, in response to detecting that the user device 20 is connected to the first network, a first request for an access to the server 30 is sent via the first network.

At block 640, in response to receiving, via the first network, a first authorization to the first request from the server 30, the measurement data to the server (30) are sent via the first network.

The example implementations of the actions in these blocks of FIG. 5 and FIG. 6 have been described in the preceding text with reference to FIGS. 1-4, and thus will not be detailed here. Also, it is understood that although the flowcharts 500 and 600 are described as a sequential process, some of the actions may be performed in parallel or concurrently. In addition, the order of the actions may be re-arranged, and additional actions not shown in the flowcharts may also be included.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be included in the scope of protection of the present disclosure. Meanwhile, appended claims of the present disclosure aim to cover all the variations and modifications falling under the scope and boundary of the claims or equivalents of the scope and boundary.

What is claimed is:

1. A data transmission method, comprising:
    receiving, at a gateway, measurement data collected by at least one monitoring device in a substation;
    storing the received measurement data in a data storage that is accessible to the gateway in a predetermined format;
    detecting a status of a connection between the gateway and a wide area access network, the wide area access network enabling communication between the gateway and a server;
    in response to detecting a disconnection between the gateway and the wide area access network, sending the measurement data to a user device via a local access network hosted by the gateway to enable the user device to forward the measurement data to the server; and
    in response to detecting a connection between the user device and the wide area access network, sending the measurement data from the user device to the server via the wide area access network,
    wherein receiving the measurement data comprises:
        sending, via the local access network, a request for the measurement data to the gateway; and
        in response to receiving, via the local access network, an authorization to the request from the gateway, receiving the measurement data at the user device, wherein receiving the measurement data at the user device comprises:
        in response to receiving the authorization that is based on a category and a geographical information associated with a user of the user device, receiving the measurement data at the user device;
    wherein the category includes a service permission associated with the user, and wherein the geographical information includes geographical rights associated with the user.

2. The method of claim 1, wherein receiving the measurement data comprising comprises:
    receiving the measurement data through a field bus connected between the gateway and the at least one monitoring device.

3. The method of claim 1, wherein sending the measurement data to the user device includes:
    retrieving the measurement data from the data storage;
    encrypting the retrieved measurement data; and
    sending the encrypted measurement data to the user device.

4. The method of claim 1, further comprising:
    receiving, at the user device, the measurement data from the gateway via the local access network hosted by the gateway;
    detecting, a status of a connection between the user device and the wide area access network, the wide area access network enabling communication between the user device and the server;
    in response to detecting that the user device is connected to the wide area access network, sending, via the wide area access network, a first request for an access to the server; and
    in response to receiving, via the wide area access network, a first authorization to the first request from the server, sending the measurement data to the server via the wide area access network.

5. The method of claim 4, wherein sending the measurement data to the server comprises:
    in response to receiving the first authorization that is based on a category and a geographical information associated with a user of the user of the user device, sending the measurement data to the server.

6. The method of claim 4, further comprising:
    in response to receiving, via the wide area access network, a confirmation of the measurement data being received at the server, deleting the measurement data from the user device.

7. A gateway, comprising:
    a controller configured to:
    receive measurement data collected by at least one monitoring device in a substation;
    store the received measurement data in a data storage that is accessible with the gateway in a predetermined format;
    detect a status of a connection between the gateway and a wide area access network, the wide area access network enabling communication between the gateway and a server;
    in response to detecting a disconnection between the gateway and the wide area access network, send the measurement data to a user device via a local access network hosted by the gateway to enable the user device to forward the measurement data to the server; and
    in response to detecting a connection between the user device and the wide area access network, sending the measurement data from the user device to the server via the wide area access network, wherein the controller is further configured to:
receiving, via the local access network, a request for the measurement data;
sending, via the local access network, an authorization that is based on a category and a geographical information associated with a user of the user device to the user device based on the request; and
sending, via the local access network, the measurement data to the user device;
wherein the category includes a service permission associated with the user, and wherein the geographical information includes geographical rights associated with the user.

8. The gateway of claim 7, wherein the wide area access network is a wide area access (WAN) network, and the local access network is a WI-FI network hosted by the gateway.

9. The gateway of claim 7, wherein the gateway is connected to the at least one monitoring device through a field bus.

10. The gateway of claim 7, wherein the controller is further configure configured to:
retrieve the measurement data from the data storage;
encrypt the retrieved measurement data; and
send the encrypted measurement data to the user device.

11. A user device, comprising:
a controller; and
a memory coupled to the controller and storing program code, the program code, when executed by the controller, causing the user device to:
receive measurement data collected by at least one monitoring device in a substation, via a local access network hosted by a gateway;
detect, a status of a connection between the user device and a wide area access network, the wide area access network enabling communication between the user device and a server;
in response to detecting a connection between the user device and the wide area access network, send, via the wide area access network, a first request for an access to the server; and
in response to receiving, via the wide area access network, a authorization to the first request from the server, send the measurement data to the server via the wide area access network,
wherein the program code, when executed by the controller, further causes the user device to:
send, via the local access network, a second request for the measurement data to the gateway; and
in response to receiving, via the local access network, an authorization that is based on a category and a geographical information associated with a user of the user device, receive the measurement data at the user device
wherein the category includes a service permission associated with the user, and wherein the geographical information includes geographical rights associated with the user.

12. The user device of claim 11, wherein the program code, when executed by the controller, further causes the user device to:
send, via the local access network, a second request for the measurement data to the gateway; and
in response to receiving, via the local access network, a second authorization to the second request from the gateway, receive the measurement data at the user device.

13. The user device of claim 11, wherein the program code, when executed by the controller, further causes the user device to:
in response to receiving, via the wide area access network, a confirmation of the measurement data being received at the server, delete the measurement data from the user device.

14. A data transmission system in a substation, comprising:
at least one monitoring device configured to collect measurement data in the substation;
a gateway connected to the at least one monitoring device via a field bus; and
a user device,
wherein the user device and the gateway are configured to jointly perform data transmission to forward the measurement data from the at least one monitoring device to a server;
wherein the data transmission comprises
receiving, at the gateway, measurement data collected by the at least one monitoring device in the substation;
storing the received measurement data in a data storage that is accessible to the gateway in a predetermined format;
detecting a status of a connection between the gateway and a wide area access network, the wide area access network enabling communication between the gateway and the server;
in response to detecting a disconnection between the gateway and the wide area access network, sending the measurement data to the user device via a local access network hosted by the gateway to enable the user device to forward the measurement data to the server; and
in response to detecting a connection between the user device and the wide area access network, sending the measurement data from the user device to the server via the wide area access network;
wherein receiving the measurement data comprises:
sending, via the local access network, a request for the measurement data to the gateway, and
in response to receiving, via the local access network, an authorization to the request from the gateway, receiving the measurement data at the user device;
wherein receiving the measurement data at the user device comprises:
in response to receiving the authorization that is based on a category and a geographical information associated with a user of the user device, receiving the measurement data at the user device;
wherein the category includes a service permission associated with the user, and wherein the geographical information includes geographical rights associated with the user.

* * * * *